US010650365B2

(12) United States Patent
You et al.

(10) Patent No.: US 10,650,365 B2
(45) Date of Patent: May 12, 2020

(54) AUTOMATED POINT OF SALE SYSTEM

(71) Applicant: Visa International Service Association, San Francisco, CA (US)

(72) Inventors: Di You, Santa Clara, CA (US); Zack Petersen, San Francisco, CA (US); Gyan Prakash, Foster City, CA (US); Sivanarayana Gaddam, Santa Clara, CA (US); Vibhor Kumar, Mountain View, CA (US); Dean Galland, Saratoga, CA (US)

(73) Assignee: Visa International Service Association, San Francisco, CA (US)

( * ) Notice: Subject to any disclaimer, the term of this patent is extended or adjusted under 35 U.S.C. 154(b) by 137 days.

(21) Appl. No.: 15/612,834

(22) Filed: Jun. 2, 2017

(65) Prior Publication Data
US 2018/0349874 A1 Dec. 6, 2018

(51) Int. Cl.
*G06Q 20/20* (2012.01)
*G06K 9/62* (2006.01)
(Continued)

(52) U.S. Cl.
CPC ......... *G06Q 20/202* (2013.01); *G06K 9/6273* (2013.01); *G06Q 20/208* (2013.01);
(Continued)

(58) Field of Classification Search
CPC .. G06Q 20/202; G06Q 30/0238; G06Q 30/04; G06K 9/6256; G06K 9/00711; G06K 9/00758
See application file for complete search history.

(56) References Cited

U.S. PATENT DOCUMENTS 8,345,984 B2 * 1/2013 Ji ........................ G06K 9/4628
382/103
9,552,647 B2 * 1/2017 Kuusisto ................ G06Q 30/02
(Continued)

FOREIGN PATENT DOCUMENTS

WO 2006105376 A2 10/2006
WO 2017088050 A1 6/2017

OTHER PUBLICATIONS

Deepika et al., "Motion Detection in Real-Time Video Surveillance With Movement Frame Capture and Auto Record", International Journal of Innovative Research in Science, Engineering and Technology, Jan. 2014, pp. 146-149, vol. 3, Special Issue 1.
(Continued)

*Primary Examiner* — A. Hunter Wilder
*Assistant Examiner* — Whitney Poffenbarger
(74) *Attorney, Agent, or Firm* — The Webb Law Firm

(57) ABSTRACT

A method for automatically analyzing a personal service session and completing a transaction therefor, includes monitoring a service location with a video camera in communication with a processor, determining that the personal service session has begun based on an identification of at least one start trigger event, analyzing an output from the video camera including a plurality of frames of video data collected during the personal service session to identify a sequence of frames of the video data, automatically matching the sequence of frames to at least one type of service that was provided during the personal service session, determining that the personal service session has ended based on an identification of at least one end trigger event, determining a transaction value associated with the types of service that have been provided during the personal service session, and generating an electronic invoice based on the determined transaction value.

31 Claims, 5 Drawing Sheets

(51) Int. Cl.
*G06Q 20/32* (2012.01)
*G06Q 30/04* (2012.01)
*G06Q 30/02* (2012.01)

(52) U.S. Cl.
CPC ..... *G06Q 20/3223* (2013.01); *G06Q 30/0238* (2013.01); *G06Q 30/04* (2013.01)

(56) References Cited

U.S. PATENT DOCUMENTS

| | | |
|---|---|---|
| 9,569,938 B1 | 2/2017 | Lampe et al. |
| 10,001,402 B1* | 6/2018 | Gyori ............... G06Q 10/087 |
| 10,064,502 B1* | 9/2018 | Gyori ..................... A47F 5/16 |
| 2008/0005055 A1* | 1/2008 | Horvitz ............... G06Q 10/04 |
| | | 706/62 |
| 2010/0205062 A1* | 8/2010 | Glatt ................. G06Q 20/102 |
| | | 705/17 |
| 2013/0030874 A1 | 1/2013 | Lin et al. |
| 2013/0080279 A1 | 3/2013 | Daily et al. |
| 2014/0278684 A1* | 9/2014 | Masciarelli ........... G06Q 50/10 |
| | | 705/7.19 |
| 2014/0347491 A1 | 11/2014 | Connor |
| 2015/0012396 A1* | 1/2015 | Puerini .............. G06Q 10/0875 |
| | | 705/28 |
| 2015/0036884 A1 | 2/2015 | Ivanchenko |
| 2015/0379619 A1 | 12/2015 | Verde |
| 2016/0253648 A1 | 9/2016 | Lipton et al. |
| 2016/0364676 A1 | 12/2016 | Chapman et al. |
| 2018/0353836 A1* | 12/2018 | Li .......................... A63B 71/06 |

OTHER PUBLICATIONS

Lin et al., "Group Event Detection with a Varying Number of Group Members for Video Surveillance", IEEE Transactions on Circuits and Systems for Video Technology, Aug. 2010, pp. 1057-1067, vol. 20, No. 8.

* cited by examiner

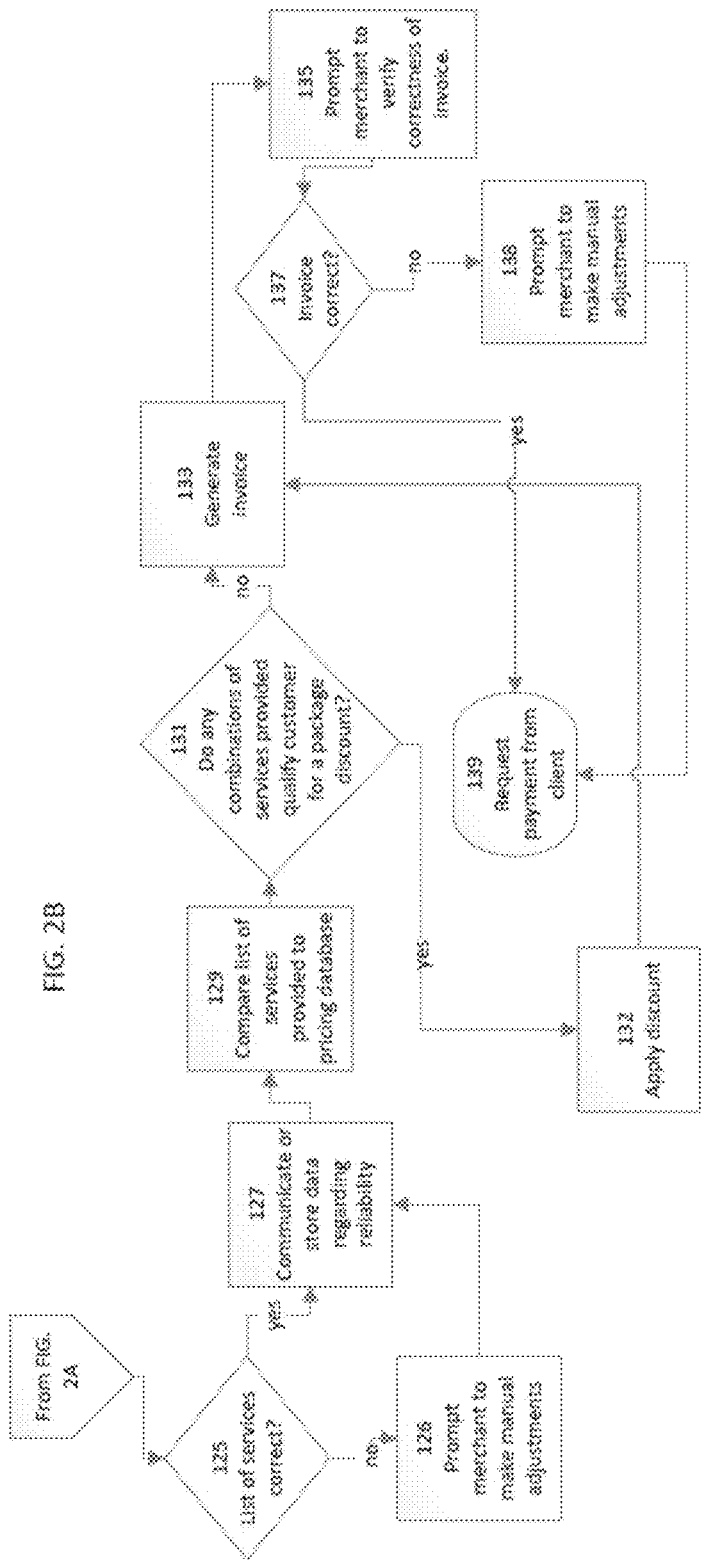

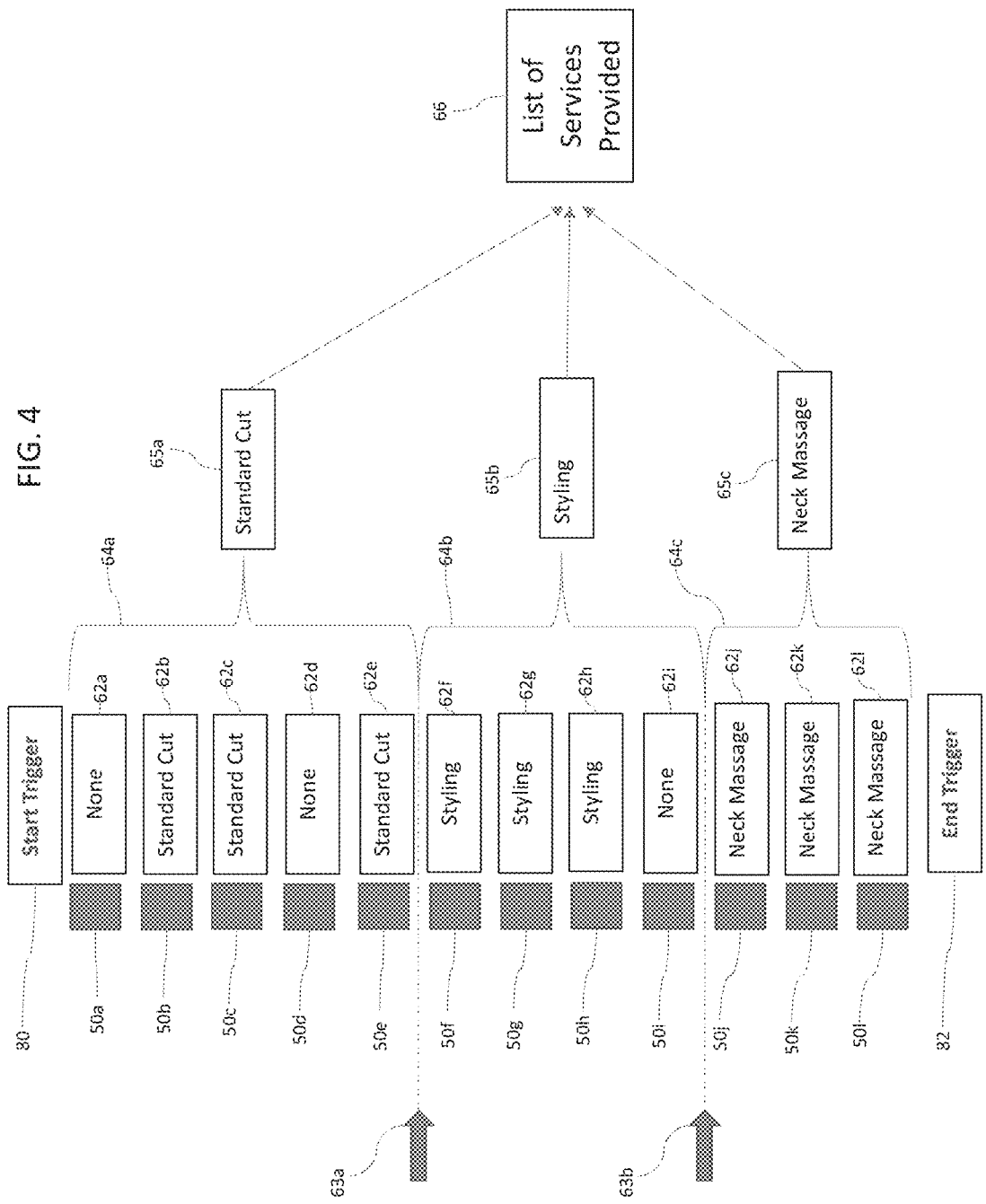

AUTOMATED POINT OF SALE SYSTEM

BACKGROUND OF THE INVENTION

1. Field of the Invention

This invention relates generally to point of sale systems and, in one particular embodiment, to a system, method, and computer program product for automatically analyzing a personal service session and completing a transaction therefor.

2. Technical Considerations

Purveyors of goods rely on point of sale ("POS") systems to select merchandise from inventory and receive payments from consumers via cash, credit/debit cards, and/or various other payment instruments. Purveyors of services, such as salons, body art vendors, car washes, and other businesses where a personal service is performed for a customer, usually on-site, also rely on POS systems to receive payment for services that have been performed. However, for services, a merchant or merchant employee must generally cease performing services that provide a direct economic benefit to the merchant's business in order to catalog and manually enter the services that have been performed and the associated costs into the POS system. Accordingly, there is a need in the art for improved systems and methods which may reduce such potential sources of inefficiency.

SUMMARY OF THE INVENTION

Accordingly, it is an object of the present invention to provide a method, system, and computer program product for automatically analyzing a personal service session and completing a transaction therefor to overcome some or all of the deficiencies in the prior art.

A computer-implemented method for automatically analyzing a personal service session and completing a transaction therefor, comprises monitoring a service location with at least one video camera in communication with at least one processor; determining, with the at least one processor, that the personal service session has begun based at least partially on an identification of at least one start trigger event; analyzing, with the at least one processor, an output from the at least one video camera comprising a plurality of frames of video data collected during the personal service session to identify at least one sequence of frames of the video data; automatically matching the at least one sequence of frames to at least one type of service that was provided during the personal service session; determining, with the at least one processor, that the personal service session has ended based at least partially on an identification of at least one end trigger event; determining, with the at least one processor, a transaction value associated with the at least one type of service that has been provided during the personal service session; and generating an electronic invoice based at least partially on the determined transaction value.

The at least one processor may comprise a processor of a merchant device. The at least one type of service may comprise a first type of service and a second type of service provided during the personal service session, and determining the transaction value of the at least one type of service may comprise determining a total value of the first type of service and the second type of service. The transition between the first type of service and the second type of service may be identified based at least partially on an identification of at least one service transition trigger event. At least one of the following events: the at least one start trigger event, the at least one end trigger event, the at least one service transition trigger event, or any combination thereof, may comprise at least one of the following: a voice command, an output from the at least one video camera, a signal from at least one additional sensor in communication with the at least one processor, a user input, or any combination thereof. The at least one start trigger event and/or the at least one end trigger event may comprise a signal from at least one additional sensor, and the at least one additional sensor may comprise at least one of the following: an additional camera, a microphone, a heat sensor, a motion sensor, a weight sensor, a capacitance sensor, or any combination thereof. Automatically matching the at least one sequence of frames to at least one type of service may comprise predicting at least one action that is occurring in at least one frame of the at least one sequence of frames based at least partially on a comparison of each of the at least one frame with historical data. The at least one action may be predicted using a convolutional neural network. The method may further comprise communicating the electronic invoice to a customer device. The method may further comprise initially monitoring the service location with the at least one video camera in communication with the at least one processor for a training period to create a database of services. The method may further comprise recording, with the at least one processor, an indication that the at least one type of service has been provided, based at least partially on the matched sequence of frames. The method may further comprise automatically determining a duration of the at least one type of service that has been provided during the personal service session, and the transaction value of the at least one type of service may be determined based at least partially on the determined duration. The at least one type of service may comprise a plurality of types of service, and the method may further comprise automatically comparing the plurality of types of service to a service package database comprising a plurality of pre-programmed service packages; and identifying whether a combination of at least two of the plurality of types of services corresponds to at least one of the plurality of pre-programmed service packages. The transaction value of the at least one type of service may be determined based at least partially on a predetermined value of the at least one pre-programmed service package.

A system for automatically analyzing a personal service session and completing a transaction therefor, comprises at least one processor configured to communicate with at least one video camera configured for monitoring a service location, the at least one processor being configured or programmed to: determine, based at least partially on an identification of at least one start trigger event, that a personal service session has begun; analyze an output from the at least one video camera comprising a plurality of frames of video data collected during the personal service session to identify at least one sequence of frames of the video data; automatically match the at least one sequence of frames to at least one type of service that was provided during the personal service session; determine that the personal service session has ended based at least partially on an identification of at least one end trigger event; determine a transaction value of the at least one type of service that has been provided during the personal service session; and generate an electronic invoice based at least partially on the determined transaction value.

The at least one processor may comprise a processor of a merchant device. The at least one type of service may comprise a first type of service and a second type of service provided during the personal service session, and determining the transaction value of the at least one type of service may comprise determining a total value of the first type of service and the second type of service. The at least one processor may be further configured or programmed to identify a transition between the first type of service and the second type of service based at least partially on an identification of at least one service transition trigger event. At least one of the at least one start trigger event, the at least one end trigger event, the at least one service transition trigger event, or any combination thereof, may comprise at least one of the following: a voice command, an output from the at least one video camera, a signal from at least one additional sensor in communication with the at least one processor, a user input, or any combination thereof. The at least one start trigger event and/or the at least one end trigger event may comprise a signal from at least one additional sensor, and the at least one additional sensor may comprise at least one of the following: an additional camera, a microphone, a heat sensor, a motion sensor, a weight sensor, a capacitance sensor, or any combination thereof. The at least one sequence of frames may be automatically matched to the at least one type of service based at least partially on a prediction of at least one action that is occurring in at least one frame of the at least one sequence of frames based at least partially on a comparison of each of the at least one frame with historical data. The at least one action may be predicted using a convolutional neural network. The at least one processor may be further configured or programmed to communicate the electronic invoice to a customer device. The at least one sequence of frames may be automatically matched to at least one type of service of a database of services, the database of services having been generated based at least partially on video data collected during a training period. The at least one processor may be further configured or programmed to record an indication that the at least one type of service has been provided, based at least partially on the matched sequence of frames. The at least one processor may be further configured or programmed to automatically determine a duration of the at least one type of service that has been provided during the personal service session, and the transaction value of the at least one type of service may be determined based at least partially on the determined duration. The at least one type of service may comprise a plurality of types of service, and the at least one processor may be further configured or programmed to: automatically compare the plurality of types of service to a service package database comprising a plurality of pre-programmed service packages; and identify whether a combination of at least two of the plurality of types of services corresponds to at least one of the plurality of pre-programmed service packages, and the transaction value of the at least one type of service may be determined based at least partially on a predetermined value of the at least one pre-programmed service package.

A computer program product for automatically analyzing a personal service session and completing a transaction therefor using at least one processor configured to communicate with at least one video camera configured to monitor a service location, comprises at least one non-transitory computer-readable medium comprising program instructions that, when executed by the at least one processor, cause the at least one processor to: determine, based at least partially on an identification of at least one start trigger event, that a personal service session has begun; analyze an output from the at least one video camera comprising a plurality of frames of video data collected during the personal service session to identify at least one sequence of frames of the video data; automatically match the at least one sequence of frames to at least one type of service that was provided during the personal service session; determine that the personal service session has ended based at least partially on an identification of at least one end trigger event; determine a transaction value of the at least one type of service that has been provided during the personal service session; and generate an electronic invoice based at least partially on the determined transaction value.

The at least one processor may comprise a processor of a merchant device. The at least one type of service may comprise a first type of service and a second type of service provided during the personal service session, and determining the transaction value of the at least one type of service may comprise determining a total value of the first type of service and the second type of service. The at least one non-transitory computer-readable medium may further comprise program instructions that, when executed by at least one processor, cause the at least one processor to identify a transition between the first type of service and the second type of service based at least partially on an identification of at least one service transition trigger event. At least one of the at least one start trigger event, the at least one end trigger event, the at least one service transition trigger event, or any combination thereof, may comprise at least one of the following: a voice command, an output from the at least one video camera, a signal from at least one additional sensor in communication with the at least one processor, a user input, or any combination thereof. The at least one start trigger event and/or the at least one end trigger event may comprise a signal from at least one additional sensor, and the at least one additional sensor may comprise at least one of the following: a further camera, a microphone, a heat sensor, a motion sensor, a weight sensor, a capacitance sensor, or any combination thereof. The at least one sequence of frames may be automatically matched to at least one type of service based at least partially on a prediction of at least one action that is occurring in at least one frame of the at least one sequence of frames based at least partially on a comparison of each of the at least one frame with historical data. The at least one action may be predicted using a convolutional neural network. The at least one non-transitory computer-readable medium may further comprise program instructions that, when executed by at least one processor, cause the at least one processor to communicate the electronic invoice to a customer device. The at least one sequence of frames may be automatically matched to at least one type of service of a database of services, the database of services having been generated based at least partially on video data collected during a training period. The at least one non-transitory computer-readable medium may further comprise program instructions that, when executed by at least one processor, cause the at least one processor to record an indication that the at least one type of service has been provided, based at least partially on the matched sequence of frames. The at least one non-transitory computer-readable medium may further comprise program instructions that, when executed by at least one processor, cause the at least one processor to automatically determine a duration of the at least one type of service that has been provided during the personal service session, and the transaction value of the at least one type of service may be determined based at least partially on the determined duration. The at least one type of service may comprise a plurality of types of service, and the at least one non-transitory computer-readable medium may further comprise program instructions that, when executed by at least one processor, cause the at least one processor to: automatically compare the plurality of types of service to a service package database comprising a plurality of pre-programmed service packages; and identify whether a combination of at least two of the plurality of types of services corresponds to at least one of the plurality of pre-programmed service packages, and the value of the at least one type of service may be determined based at least partially on a predetermined value of the at least one pre-programmed service package.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which:

FIGS. 2A-B depict a flow diagram illustrating a system and method for automatically analyzing a personal service session and completing a transaction therefor in accordance with the principles of the invention.

FIG. 4 is a schematic diagram illustrating a process for classifying a plurality of sequences of frames in accordance with the principles of the invention.

DESCRIPTION OF THE PREFERRED EMBODIMENTS

Figure 1:
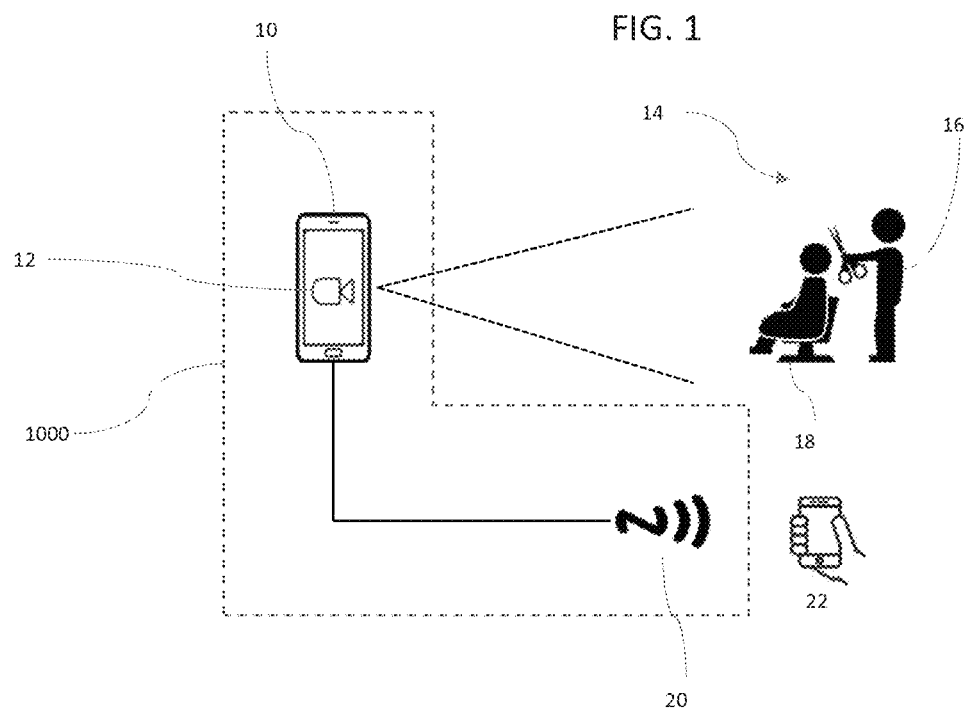
FIG. 1 is a schematic diagram of a system for monitoring a personal service session and completing a transaction therefor in accordance with the principles of the invention.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. The term "merchant" may also refer to one or more employees, contractors, workers, or other persons acting on behalf of a merchant.

A "point-of-sale (POS) system," as used herein, may refer to one or more computers and/or peripheral devices used by a merchant to engage in payment transactions with customers. In various non-limiting embodiments, a POS may comprise one or more processors in communication with one or more card readers, near-field communication (NFC) receivers, radio-frequency identification (RFID) receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices that are configured to communicate with one or more networks. As an example, a mobile device may include a cellular phone (e.g., a smartphone or standard cellular phone), a portable computer, a wearable device (e.g., a watch, glasses, lenses, clothing, and/or the like), a personal digital assistant (PDA), and/or other like devices.

As used herein, the term "merchant device" refers to one or more electronic devices, such as, for example, a mobile device or other computer, belonging to or otherwise under the control of a merchant. As used herein, the term "customer device" refers to one or more electronic devices, such as, for example, a mobile device or other computer, belonging to or otherwise under the control of a customer or potential customer.

As used herein, the term "electronic invoice" refers to a list of services and/or goods that have been provided to a customer, and, in some non-limiting examples, may further include a transaction value for one or more of the provided services and/or goods. In non-limiting examples, an electronic invoice may be electronically generated by a merchant device or other processor in communication with the system. In non-limiting embodiments, the electronic invoice may be printed, electronically generated on a display device, electronically transmitted to remote processor, or otherwise communicated to various entities associated with a transaction. It will be appreciated by those skilled in the art that various approaches for generating and communicating an electronic invoice are possible.

As used herein, the term "electronic wallet" refers to one or more electronic devices and/or software applications that are configured to initiate and/or conduct payment transactions. An electronic wallet may include an electronic wallet application that is executed by a mobile device operated by a customer, and may further include server-side software and databases for maintaining and providing transaction data to the mobile device. An "electronic wallet provider" may include an entity that provides and/or maintains an electronic wallet for a customer, such as Google Wallet™, Android Pay™ Apple Pay®, Samsung Pay®, and/or other like electronic payment systems. In some non-limiting examples, an issuer institution may be an electronic wallet provider.

As used herein, the term "personal service" refers to a service based on the skill and/or manual efforts of a human, animal, robot, or other working entity. As used herein, the term "personal service session" refers to a time period during which one or more personal services have been provided and/or are potentially to be provided for a customer.

As used herein, the term "frame" refers to one or more of a plurality of images or portions of images that make up a video. For example, as used herein, the term "frame" may refer to the entire viewing area of a video camera at a particular point in time, or in some non-limiting examples, the term "frame" may refer to only a portion of this viewing area (for example, a focal area corresponding to the service location), which is to be processed by the system. It will be appreciated by those skilled in the art that various approaches for identifying a "frame" are possible in accordance with the principles of the invention.

As used herein, a "sequence of frames" refers to a plurality of frames collected by a video camera during a time interval. A "sequence of frames" may refer to any grouping of a plurality of frames collected by a video camera during a time interval, regardless of whether there are intervening frames which are not included in the grouping and regardless of whether the grouping is in chronological order. For example, in non-limiting embodiments, less than all frames collected by the video camera may be processed, and instead only a portion of the frames collected during a given time period may be processed at regular, irregular, or randomized intervals.

As used herein, "classifying," as applied to a frame or sequence of frames, refers to generating a classification of activities that were captured by the video camera during the time at which the frame or sequence of frames was collected.

As used herein, the term "sub-frame" refers to a portion or section of an image which constitutes a frame. Similarly, as used herein, the term "sub-sub-frame" refers to a portion or section of a sub-frame.

As used herein, the term "filter" refers to a set of parameters used to identify various visual features in a frame, sub-frame, or sub-sub-frame, and so forth. Various filters may be employed as part of a feature detection process which allows the system to look for edges, corners, interest points, clusters/regions of interest, points, ridges, and/or the like to aid in classifying one or more frames or sequences of frames. As used herein, the terms "filtered frame," "filtered sub-frame," and "filtered sub-sub-frame" refer to frames that have been processed according to one or more filters as part of an image classification process.

As used herein, the term "trigger event" refers to an event that indicates to a processor, such as but not limited to a processor associated with the automated POS system discussed herein or a processor in communication therewith, that some action is to be performed. A trigger event may be conveyed as a signal from one or more sensors, computers, software applications, input devices, and/or the like. A trigger event may also be detected by a processor by monitoring a data source, such as but not limited to a microphone and/or video camera. For example, a trigger event may include a variable meeting or exceeding a threshold value, a word, phrase or sound, a physical activity, a gesture, a user input, and/or the like. As used herein, the term "start trigger event" refers to a trigger event associated with an indication that a personal service session is about to begin or has begun, the term "transition trigger event" refers to a trigger event associated with an indication of a change in type of service being provided during a personal service session, and the term "end trigger event" refers to a trigger event associated with an indication that a personal service session is about to end or has ended.

In non-limiting embodiments, trigger events may be based on the matching of a frame or sequence of frames collected by the video camera to a particular event, a signal received from or a determination based on one or more other sensors such as cameras, microphones, heat sensors, motion sensors, weight sensors, capacitance sensors, or the like. For example, in non-limiting embodiments, a trigger event may include the identification of a word or phrase indicating that a particular type of service is beginning (e.g., a wake word, phrase, or command), a word or phrase indicating that a particular type of service is ending and another type of service is about to begin (e.g., a change of service word, phrase or command), a word or phrase indicating that a session has ended (e.g., a termination word, phrase or command), and/or the like. It will be appreciated by those skilled in the art that a trigger event may take various forms in accordance with the principles of the invention.

Non-limiting embodiments of the present invention are directed to an improved (POS) system for automatically analyzing a personal service session and completing a transaction therefor, in addition to associated systems, methods, and computer program products. In particular, non-limiting embodiments are directed to an improved POS system and method that utilizes one or more video cameras and/or other sensors to automatically generate an electronic invoice on a merchant device based on personal services performed for a customer. An artificial neural network, such as a convolutional neural network, may be used in some non-limiting embodiments to automatically match sequences of frames to types of services that have been provided during a personal service session. In non-limiting embodiments, the merchant device may be configured or programmed to generate a draft electronic invoice based on the automatically matched sequences of frames and allow the merchant to make corrections which are input back into the artificial neural network in order to improve the functionality of the merchant device and the algorithm in subsequent service sessions.

Referring now to FIG. 1, a system for analyzing a personal service session is shown according to a non-limiting embodiment. An automated POS system 1000 comprises a merchant device 10 in communication with a camera 12 and a peripheral device 20. In the non-limiting embodiment shown in FIG. 1, the camera 12 is integral to the merchant device 10. However, it will be appreciated by persons skilled in the art that various arrangements are possible and that, in non-limiting embodiments, a separate camera may be provided in communication with the merchant device.

In non-limiting embodiments, the peripheral device 20 may comprise one or more card readers, (NFC) receivers, RFID receivers, and/or other contactless transceivers or receivers, contact-based receivers, payment terminals, computers, servers, input devices, and/or other like devices that can be used to initiate a payment transaction. For example, the peripheral device 20 may include a further POS system such as an additional mobile POS system that is in communication with the merchant device 10. However, persons skilled in the art will appreciate that the use of one or more peripheral devices 20 is optional. For example, the merchant device 10 may include one or more card readers, (NFC) receivers, RFID receivers, and/or other contactless transceivers or receivers, contact-based receivers, input devices, sensors, and/or other like devices that are used to initiate a payment transaction. Moreover, such components may also be part of a separate computer or system and in communication with the merchant device 10. For example, in non-limiting embodiments, the merchant device 10 may comprise an internal receiver configured to accept payment from a customer device 10. Additionally or alternatively, the merchant device 10 may allow the merchant 16 and/or the customer 18 to view and/or verify an electronic invoice on an electronic display device located on the merchant device 10 and/or on another computer in communication with the merchant device 10. Moreover, the merchant device 10 may be programmed or configured to receive and record user input from the merchant regarding a transaction such as, for example, indicating that a payment has been received via cash or check.

With continued reference to FIG. 1, the video camera 12 is arranged to monitor a service location 14 where a merchant 16 may perform a personal service for a customer 18. Additionally, in non-limiting embodiments, one or more additional sensors such as cameras, microphones, heat sensors, motion sensors, weight sensors, capacitance sensors, other sensors, and/or the like (not shown in FIG. 1) may further be provided in communication with the merchant device 10. Data from such additional sensors may be processed by the system to detect start trigger events, end trigger events, service transition trigger events, and/or to classify frames and/or sequences of frames, and/or match such sequences to services that have been provided. It will be appreciated that various configurations are possible.

Figure 2A:
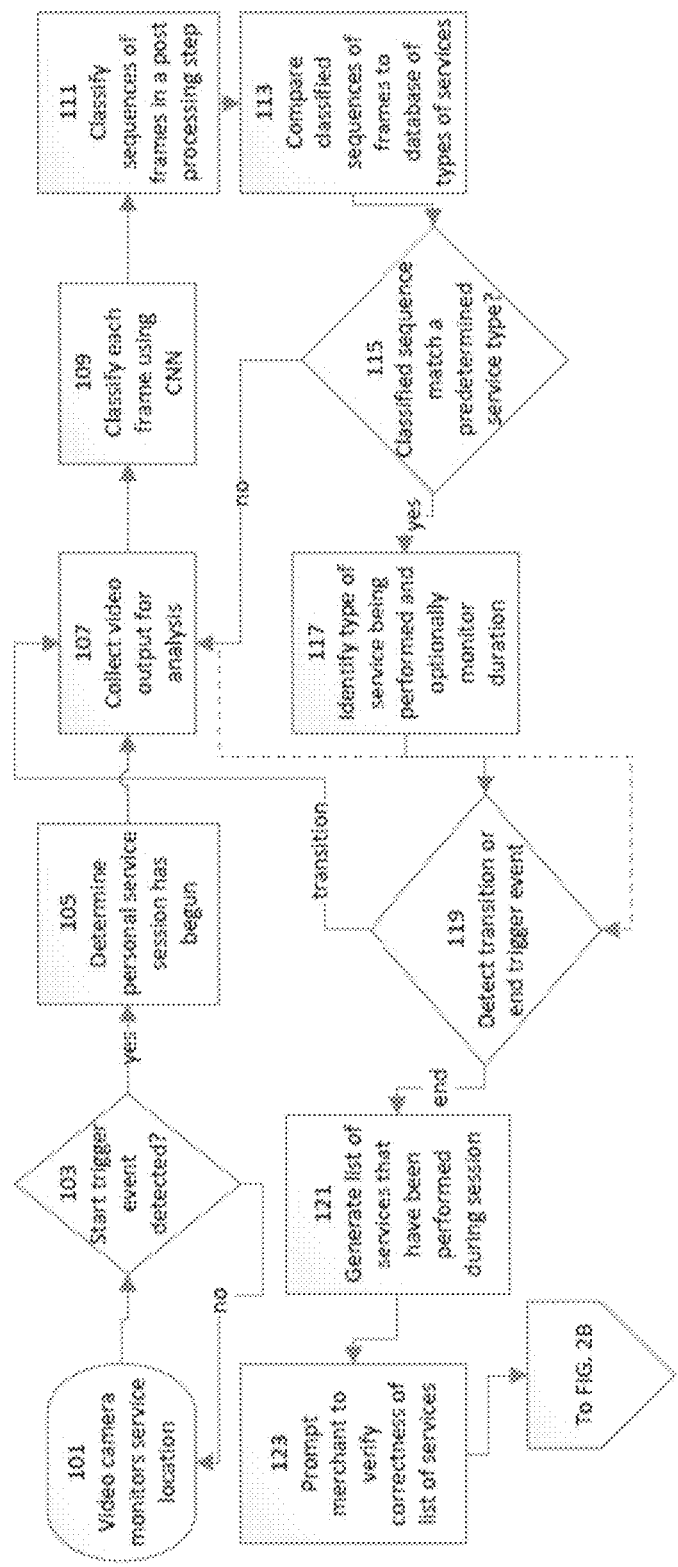

Referring now to FIGS. 2A-B, a flow diagram of a method for automatically analyzing a personal service session and completing a transaction therefor is shown according to a non-limiting embodiment. With reference to FIGS. 1 and 2A, in step 101, the video camera 12 monitors the service location 14. In step 103, while monitoring the service location 14, the merchant device 10 periodically or continuously processes video data from the video camera to detect a start trigger event indicating the beginning of a personal service session. Absent the detection of a start trigger event, the video camera 12 continues to monitor the service location 14 and process the video data to detect for a start trigger event.

In non-limiting embodiments, visual, audial, audiovisual, and/or other monitoring may be conducted periodically, continuously, or upon activation by the merchant. In further non-limiting embodiments, video camera 12 may collect but not store or communicate data until a start trigger event is detected, for example, by the video camera itself through an internally or externally performed image recognition process, such as the processes disclosed herein with reference to the automated POS system 1000. In further non-limiting examples, the video camera 12 may be configured to enter a "sleep" mode after a prolonged period of inactivity, during which no video data is collected, and may be further configured to respond to a start trigger event, such as but not limited to a wake word detected based on audio data received from a microphone, a signal from a weight sensor that a person has sat in a chair located in the service location, a signal from a motion sensor that one or more persons has entered the service area, and/or various other data from the video camera 12 or other sensor in communication with the automated POS system 1000. At such time the video camera 12 may resume collecting, communicating, storing, and/or analyzing video data of the service location 14. Persons skilled in the art will appreciate that various arrangements are possible in accordance with the principles of the present invention.

With continued reference to FIG. 2A, in step 105, upon detection of a start trigger, the merchant device determines that a personal service session has commenced and, in step 107, the merchant device begins collecting video output for analysis. In step 109, each frame of the video output (e.g., raw video data) or, in other non-limiting examples, each of a plurality of frames of the video output taken at regular or irregular intervals, is classified using an artificial neural network, such as a convolutional neural network (CNN). In step 111, sequences of frames are then classified in a post-processing step, which allows for the reduction of noise which may frequently occur when frames are classified individually. In step 113, each classified sequence of frames is compared to a database of potential service types, which may be generalized, may be identified in advance to correspond to the appropriate type of merchant, or, in some non-limiting examples, may be selected by a user, for example, by using an application in communication with the merchant device.

In the event that the classified sequence of frames is determined to not correspond to a potential service type, the system registers "none," or no indication at all, for the relevant time interval and repeats steps 107-115 until a sequence of frames matches a potential service type or until an end trigger event or transition trigger event is detected. In response to a classified sequence of frames being matched to a potential service type, the system records that this service has been performed and optionally monitors a duration until a transition trigger event (e.g., 63a in FIG. 4) is identified. Upon identification of a transition trigger event, the system repeats steps 107-115 until a sequence of frames matches a second potential service type or until an end trigger event or subsequent transition trigger event (e.g., 63b in FIG. 4) is detected.

In non-limiting examples, if the system registers "none" for the entire period of time between two trigger events, the system indicates that an error has occurred, invites the merchant to make appropriate corrections, and records and/or transmits the corrections for future or concurrent use in improving the system, for example, via a machine learning algorithm associated with the CNN.

With continued reference to FIG. 2A, in step 121, once an end trigger event has been detected, a list of services that have been performed during the personal service session is generated and may be displayed electronically for the merchant to review, for example in the form of a draft electronic invoice on a display device located on the merchant device, a peripheral device, and/or other computer in communication with the system. In step 123, the system prompts the merchant to verify that the list of services is correct. With reference to FIG. 2B, in step 125, the merchant reviews the draft electronic invoice and provides an indication as to whether any corrections are necessary. If the merchant identifies inaccuracies, in step 126, the merchant is prompted to make any necessary correction manually. In step 127, data regarding the accuracy or inaccuracy of the most recent predictions is recorded and/or transmitted for future or concurrent use in improving the system.

In step 129, the list of services that have been provided is compared to a pricing database to match each service to its respective predetermined price. In non-limiting embodiments, the recorded duration of each type of service may also be accounted for in determining pricing. For example, the pricing database may include a price per unit of time for a particular service that is multiplied by the duration to determine a price. Additionally, in non-limiting embodiments, the pricing database may include information regarding combinations of services that may qualify a customer for a "package deal" or other discount. In non-limiting examples, in step 131, the system determines whether all or any subset of the services that have been provided during the personal service session qualify for a package discount, and, if so, in step 132, the discount is applied before the electronic invoice is generated in step 133.

With continued reference to FIG. 2B, in step 135, the system prompts the merchant to verify whether the electronic invoice, which now includes pricing information, is correct (e.g., that it is to be billed as-is). If the merchant determines that corrections or adjustments are required, in step 138 the merchant is prompted to make any necessary manual adjustments. In step 139, payment is requested from the customer.

In non-limiting examples, a payment request including the electronic invoice may be communicated to a customer device to request payment via an electronic wallet application, a mobile checkout process, and/or the like, and the system may automatically record that payment has been received in response to the customer completing a payment transaction. For example, the payment request may cause the customer device to display one or more graphical user interfaces (GUIs) for completing a purchase with credentials, inputted account data, and/or the like. In further examples, a payment request may be displayed on a display device that is accessible to the customer for verification, and payment may be requested via cash or portable financial device. Persons skilled in the art will appreciate that various arrangements are possible in accordance with the principles of the invention.

Figure 3:
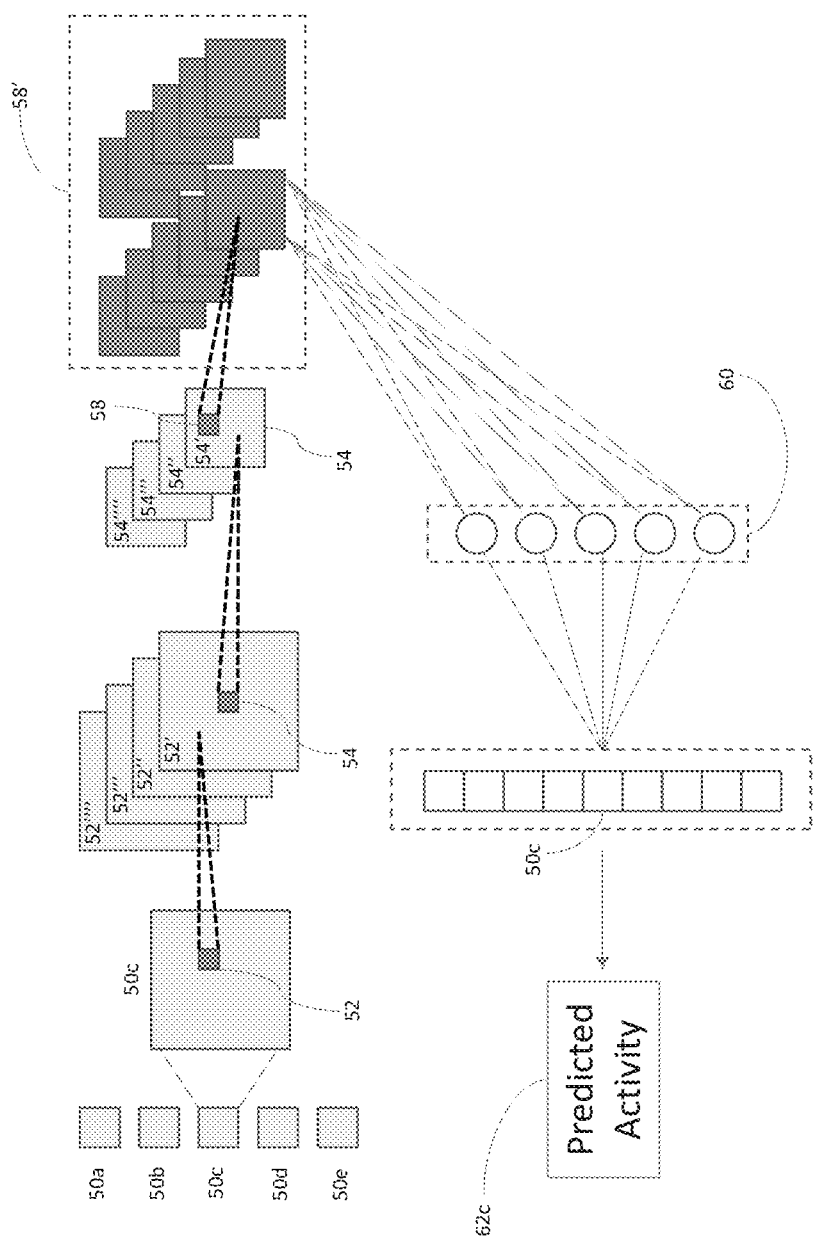
FIG. 3 is a schematic diagram illustrating a process for classifying a frame using an artificial neural network in accordance with the principles of the invention.

Referring now to FIG. 3, a process for classifying each of a plurality of frames 50*a-e* using a CNN is illustrated in greater detail according to a non-limiting embodiment. In particular, the non-limiting illustration shown in FIG. 3 follows one frame 50*c* of a plurality of frames 50*a-e* through a classification process.

As illustrated in FIG. 3, a frame 50*c* is divided into a plurality of sub-frames (e.g., 52). Each sub-frame is then processed according to a plurality of filters to generate a plurality of filtered sub-frames (e.g., 52'-52''''). Each sub-frame is then divided into a plurality of sub-sub-frames (e.g., 54) and each sub-sub-frame is processed according to a plurality of further filters to generate a plurality of filtered sub-sub-frames (e.g., 54'-54''''). In non-limiting embodiments, the plurality of further filters applied to the sub-sub-frames may correspond to the plurality of filters applied to the sub-frames such that the filters may be used to more specifically identify where in each sub-frame various relevant features occur. It will be appreciated that the sub-sub-frames may be further divided into a plurality of further sub-sub-frames (not shown in FIG. 3) and also processed according to a plurality of filters, and that such further division and processing of those sub-sub-frames may also be performed. Based on the features that are identified in each filtered sub-sub-frame, the system may identify a fully-connected hidden layer which is used to predict what event or events 60 are observed based on the frame 50*c*. The combination of events 60 which are predicted to have occurred are then used to generate an overall predicted activity and to produce a classified frame 62*c* which is associated therewith.

Referring now to FIG. 4, a process for classifying a plurality of frames 50*a-l* is shown in greater detail according to a non-limiting embodiment. As illustrated in FIG. 4, upon the identification of a start trigger event 80, the automated POS system determines that a personal service session has begun and begins collecting video output for analysis. A plurality of sequential frames 50*a-l* are classified as discussed above with reference to FIG. 3 to generate corresponding classified frames 62*a-l*.

In non-limiting embodiments, one or more transition trigger events (e.g., 63*a, b*) may be utilized to aid the automated POS system in determining when one service ends and the next service begins and to thereby group the classified frames 62*a-l*. For example, in the non-limiting illustration shown, classified frames 62*a-e* which occur between the start trigger event 80 and first transition trigger event 63*a* are identified as corresponding to a first service period 64*a*, classified frames 62*f-i* which occur between first transition trigger event 63*a* and second transition trigger event 63*b* are identified as corresponding to a second service period 64*b*, and classified frames 62*j-l* which occur between second transition trigger event 63*b* and end trigger event 82 are identified as corresponding to a third service period 64*c*.

By grouping the classified frames in this manner, the system can efficiently predict what type of service has been provided during each service period by cross-referencing the observed activities which occur most frequently among the classified frames (e.g., 62*f-i*) during the relevant service period (e.g., 64*b*) with a database of services which the merchant typically provides (or plans to provide with some measure of frequency) and utilize this data to generate a classified sequence of frames (e.g., 65*b*). Upon identification of an end trigger event 82, the automated POS system determines that the personal service session has ended and aggregates the classified sequences of frames 65*a-c* to generate a list of types of service 66 (and, in some non-limiting examples, the durations thereof) which have been provided during the personal service session, which forms the basis of an electronic invoice.

Although the invention has been described in detail for the purpose of illustration based on what are currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A computer-implemented method for automatically analyzing a personal service session between a merchant individual and a customer and completing a transaction therefor, comprising:
   monitoring a service location, the merchant individual, and the customer with at least one video camera in communication with at least one processor;

determining, with the at least one processor, that the personal service session has begun based at least partially on an identification of at least one start trigger event;

analyzing, with the at least one processor, an output from the at least one video camera comprising a plurality of frames of video data collected during the personal service session to identify at least one sequence of frames of the video data;

identifying, with the at least one processor, at least one service transition trigger event occurring after the at least one start trigger event based on monitoring at least the merchant individual and the customer with the at least one video camera and analyzing the output, the at least one service transition trigger event representing a transition between a first type of service provided by the merchant individual to the customer and a second type of service provided by the merchant individual to the customer during the personal service session;

automatically matching at least one frame of the at least one sequence of frames preceding the at least one service transition trigger event to the first type of service and at least one frame of the at least one sequence of frames succeeding the at least one service transition trigger event to the second type of service that was provided during the personal service session, wherein the first type of service is different than the second type of service, and wherein the first type of service is provided to the customer during a time period between the at least one start trigger event and the at least one service transition trigger event;

determining, with the at least one processor, that the personal service session has ended based at least partially on an identification of at least one end trigger event;

determining, with the at least one processor, a transaction value associated with the personal service session by determining a total monetary value of at least the first type of service and the second type of service based on a first monetary value of the first type of service and a second monetary value of the second type of service, wherein the first monetary value is different than the second monetary value; and generating an electronic invoice based at least partially on the determined transaction value.

2. The computer-implemented method according to claim 1, wherein the at least one processor comprises a processor of a merchant device.

3. The computer-implemented method according to claim 1, wherein at least one of the following events: the at least one start trigger event, the at least one end trigger event, the at least one service transition trigger event, or any combination thereof, comprises at least one of the following: a voice command, an output from the at least one video camera, a signal from at least one additional sensor in communication with the at least one processor, a user input, or any combination thereof.

4. The computer-implemented method according to claim 1, wherein the at least one start trigger event and/or the at least one end trigger event comprises a signal from at least one additional sensor, and wherein the at least one additional sensor comprises at least one of the following: an additional camera, a microphone, a heat sensor, a motion sensor, a weight sensor, a capacitance sensor, or any combination thereof.

5. The computer-implemented method according to claim 1, wherein automatically matching the at least one sequence of frames to at least one type of service comprises predicting at least one action that is occurring in at least one frame of the at least one sequence of frames based at least partially on a comparison of each of the at least one frame with historical data.

6. The computer-implemented method according to claim 5, wherein the at least one action is predicted using a convolutional neural network.

7. The computer-implemented method according to claim 1, further comprising communicating the electronic invoice to a customer device.

8. The computer-implemented method according to claim 1, further comprising initially monitoring the service location with the at least one video camera in communication with the at least one processor for a training period to create a database of services.

9. The computer-implemented method according to claim 1, further comprising recording, with the at least one processor, an indication that at least one of the first type of service and the second type of service have been provided, based at least partially on the matched sequence of frames.

10. The computer-implemented method according to claim 1, further comprising automatically determining a duration of at least one of the first type of service and the second type of service, wherein the transaction value of the at least one of the first type of service and the second type of service is determined based at least partially on the determined duration.

11. The computer-implemented method according to claim 1, wherein the at least one type of service comprises a plurality of types of service, the method further comprising:

automatically comparing the plurality of types of service to a service package database comprising a plurality of pre-programmed service packages; and identifying whether a combination of at least two of the plurality of types of services corresponds to at least one of the plurality of pre-programmed service packages, wherein the transaction value of at least one of the first type of service and the second type of service is determined based at least partially on a predetermined value of the at least one pre-programmed service package.

12. A system for automatically analyzing a personal service session between a merchant and a customer and completing a transaction therefor, comprising at least one processor configured to communicate with at least one video camera configured for monitoring a service location, the at least one processor being configured or programmed to:

determine, based at least partially on an identification of at least one start trigger event, that a personal service session has begun;

analyze an output from the at least one video camera comprising a plurality of frames of video data collected during the personal service session to identify at least one sequence of frames of the video data;

identify at least one service transition trigger event occurring after the at least one start trigger event based on monitoring the merchant and the customer with the at least one video camera and analyzing the output, wherein the at least one service transition trigger event represents a transition between a first type of service provided by the merchant to the customer and a second type of service provided by the merchant to the customer during the personal service session;

automatically match at least one frame of the at least one sequence of frames preceding the at least one service transition trigger event to the first type of service and at least one frame of the at least one sequence of frames succeeding the at least one service transition trigger event to the second type of service that was provided during the personal service session;

determine that the personal service session has ended based at least partially on an identification of at least one end trigger event;

automatically determine a duration of at least one of the first type of service and the second type of service;

determine a transaction value of the personal service session by determining a total value of at least the first type of service and the second type of service, wherein the transaction value is determined based at least partially on the determined duration and a price per unit of time associated with the at least one of the first type of service and the second type of service; and generate an electronic invoice based at least partially on the determined transaction value.

13. The system according to claim 12, wherein the at least one processor comprises a processor of a merchant device.

14. The system according to claim 12, wherein at least one of the at least one start trigger event, the at least one end trigger event, the at least one service transition trigger event, or any combination thereof, comprises at least one of the following: a voice command, an output from the at least one video camera, a signal from at least one additional sensor in communication with the at least one processor, a user input, or any combination thereof.

15. The system according to claim 12, wherein the at least one start trigger event and/or the at least one end trigger event comprises a signal from at least one additional sensor, and wherein the at least one additional sensor comprises at least one of the following: an additional camera, a microphone, a heat sensor, a motion sensor, a weight sensor, a capacitance sensor, or any combination thereof.

16. The system according to claim 12, wherein the at least one sequence of frames is automatically matched to at least one of the first type of service and the second type of service based at least partially on a prediction of at least one action that is occurring in at least one frame of the at least one sequence of frames based at least partially on a comparison of each of the at least one frame with historical data.

17. The system according to claim 16, wherein the at least one action is predicted using a convolutional neural network.

18. The system according to claim 12, wherein the at least one processor is further configured or programmed to communicate the electronic invoice to a customer device.

19. The system according to claim 12, wherein the at least one sequence of frames is automatically matched to at least one type of service of a database of services, the database of services having been generated based at least partially on video data collected during a training period.

20. The system according to claim 12, wherein the at least one processor is further configured or programmed to record an indication that at least one of the first type of service and the second type of service have been provided, based at least partially on the matched sequence of frames.

21. The system according to claim 12, wherein the at least one type of service comprises a plurality of types of service, the at least one processor being further configured or programmed to:

automatically compare the plurality of types of service to a service package database comprising a plurality of pre-programmed service packages; and identify whether a combination of at least two of the plurality of types of services corresponds to at least one of the plurality of pre-programmed service packages, wherein the transaction value of at least one of the first type of service and the second type of service is determined based at least partially on a predetermined value of the at least one pre-programmed service package.

22. A computer program product for automatically analyzing a personal service session between a merchant and a customer and completing a transaction therefor using at least one processor configured to communicate with at least one video camera configured to monitor a service location, the computer program product comprising at least one non-transitory computer-readable medium comprising program instructions that, when executed by the at least one processor, cause the at least one processor to:

determine, based at least partially on an identification of at least one start trigger event, that a personal service session has begun;

analyze an output from the at least one video camera comprising a plurality of frames of video data collected during the personal service session to identify at least one sequence of frames of the video data;

identify at least one service transition trigger event occurring after the at least one start trigger event based on monitoring the merchant and the customer with the at least one video camera and analyzing the output, wherein the at least one transition trigger event represents a transition between a first type of service provided by the merchant to the customer and a second type of service provided by the merchant to the customer during the personal service session;

automatically match at least one frame of the at least one sequence of frames preceding the at least one service transition trigger event to the first type of service and at least one frame of the at least one sequence of frames succeeding the at least one service transition trigger event to the second type of service that was provided during the personal service session;

determine that the personal service session has ended based at least partially on an identification of at least one end trigger event;

automatically determine a duration of at least one of the first type of service and the second type of service;

determine a transaction value of the personal service session by determining a total value of at least the first type of service and the second type of service, wherein the transaction value is determined based at least partially on the determined duration and a price per unit of time associated with the at least one of the first type of service and the second type of service; and generate an electronic invoice based at least partially on the determined transaction value.

23. The computer program product according to claim 22, wherein the at least one processor comprises a processor of a merchant device.

24. The computer program product according to claim 22, wherein at least one of the at least one start trigger event, the at least one end trigger event, the at least one service transition trigger event, or any combination thereof, comprises at least one of the following: a voice command, an output from the at least one video camera, a signal from at least one additional sensor in communication with the at least one processor, a user input, or any combination thereof.

25. The computer program product according to claim 22, wherein the at least one start trigger event and/or the at least one end trigger event comprises a signal from at least one additional sensor, and wherein the at least one additional sensor comprises at least one of the following: a further camera, a microphone, a heat sensor, a motion sensor, a weight sensor, a capacitance sensor, or any combination thereof.

26. The computer program product according to claim 22, wherein the at least one sequence of frames is automatically matched to at least one of the first type of service and the second type of service based at least partially on a prediction of at least one action that is occurring in at least one frame of the at least one sequence of frames based at least partially on a comparison of each of the at least one frame with historical data.

27. The computer program product according to claim 26, wherein the at least one action is predicted using a convolutional neural network.

28. The computer program product according to claim 22, wherein the at least one non-transitory computer-readable medium further comprises program instructions that, when executed by at least one processor, cause the at least one processor to communicate the electronic invoice to a customer device.

29. The computer program product according to claim 22, wherein the at least one sequence of frames is automatically matched to at least one type of service of a database of services, the database of services having been generated based at least partially on video data collected during a training period.

30. The computer program product according to claim 22, wherein the at least one non-transitory computer-readable medium further comprises program instructions that, when executed by at least one processor, cause the at least one processor to record an indication that at least one of the first type of service and the second type of service has been provided, based at least partially on the matched sequence of frames.

31. The computer program product according to claim 22, wherein the at least one type of service comprises a plurality of types of service, the at least one non-transitory computer-readable medium further comprising program instructions that, when executed by at least one processor, cause the at least one processor to:

automatically compare the plurality of types of service to a service package database comprising a plurality of pre-programmed service packages; and identify whether a combination of at least two of the plurality of types of services corresponds to at least one of the plurality of pre-programmed service packages, wherein the transaction value of at least one of the first type of service and the second type of service is determined based at least partially on a predetermined value of the at least one pre-programmed service package.

* * * * *